United States Patent [19]

Chiu

[11] Patent Number: 5,188,430
[45] Date of Patent: Feb. 23, 1993

[54] STRUCTURE FOR A GOLF CART WHEEL SHAFT

[75] Inventor: Hsiu-Hui Chiu, Tainan Hsien, Taiwan

[73] Assignee: Sunshon Molding Co., Ltd., Tainan Hsien, Taiwan

[21] Appl. No.: 813,096

[22] Filed: Dec. 24, 1991

[51] Int. Cl.⁵ ............................................ B60B 37/00
[52] U.S. Cl. .................................. 301/111; 301/112; 301/131
[58] Field of Search ............. 301/1, 63 PW, 111, 112, 301/119, 120, 121, 122, 124 R, 126, 131; 16/45, 46

[56] References Cited

U.S. PATENT DOCUMENTS

| | | | |
|---|---|---|---|
| 1,375,223 | 4/1921 | McIntyre | 301/112 X |
| 2,532,605 | 12/1950 | Castleberry | 301/126 X |
| 5,042,882 | 8/1991 | Kuhn et al. | 301/105 X |

FOREIGN PATENT DOCUMENTS

| | | | |
|---|---|---|---|
| 1505849 | 3/1969 | Fed. Rep. of Germany | 301/111 |
| 3811757 | 10/1989 | Fed. Rep. of Germany | 301/111 |
| 2403214 | 5/1979 | France | 301/131 |
| 2607754 | 6/1988 | France | 301/112 |
| 2110609 | 6/1983 | United Kingdom | 301/111 |

Primary Examiner—Russell D. Stormer
Attorney, Agent, or Firm—Morton J. Rosenberg; David I. Klein

[57] ABSTRACT

A structure for a golf cart wheel shaft having two hole bushings fixed in opposing ends of a central bore of a hub of the golf cart wheel. A shaft bushing is disposed within the central bores of the hole bushings for receiving a wheel shaft within the interior of the shaft bushing. The wheel shaft is engaged within the shaft bushing and both rotate together by means of two fitting tips, each of the two fitting tips being formed on a respective one of two clamping fingers. The fitting tips pass through respective holes in the shaft bushing to engage respective recesses formed in the shaft.

1 Claim, 3 Drawing Sheets

STRUCTURE FOR A GOLF CART WHEEL SHAFT

A conventional golf cart wheel shaft shown in FIG. 3 comprises two ball bearings 11, each properly fixed in spaced relation within a central hole 121 of a shaft supporting cylinder 12. The ball bearings 11 support and position a shaft bushing 13, from which a shaft 14 extends. The shaft 14 has a threaded hole 141 at the outer end for receipt of a thumb screw 15 with a head 151 for coupling one to another so as to make the shaft bushing 13 move together with the shaft 14. The conventional golf cart wheel shaft has been found to have the following drawbacks.

1. The bearings 11 and the shaft bushing 13 are knocked manually into their position during assembly thereof, but the shaft 14 often becomes biased because of uneven forces applied thereto when it is struck, resulting in unsmooth rolling of the wheel.
2. The bearings 11 and the shaft bushing 13 are made of metal, having high cost, but without providing a long service life.
3. The balls in the bearings 11 can be prevented from proper rotation by dirt and sand after a period of use on a golf course, which is detrimental to rotation of the wheel.

SUMMARY OF THE INVENTION

This invention has been devised to supply a structure for a golf cart wheel shaft to overcome the drawbacks mentioned above.

The structure for a golf cart wheel shaft in the present invention has been designed to have the following advantages.

1. The shaft bushing is provided with clamping fingers so as to firmly combine the shaft bushing with the shaft, and they can be made as a separate unit to save time and work, and resulting in lower cost.
2. Hole bushings are securely and firmly fixed within the hub of the wheel by insertion while the hole bushings are soft, not yet hardened, as when they are just coming out of the mold. The hole bushings are thereby able to keep the shaft rotatably stabilized after the hole bushings have hardened.
3. The elastic clamping fingers can be operated quickly to couple the shaft and the shaft bushing all together in their operative position to rotate synchronously, upgrading the effectiveness of assembly.
4. The hole bushings and the shaft bushing are assembled with an extremely close fit so that dirt or sand cannot easily go into the gap therebetween, so that the wheel can rotate very smoothly.

DETAILED DESCRIPTION OF THE INVENTION

Figure 1:
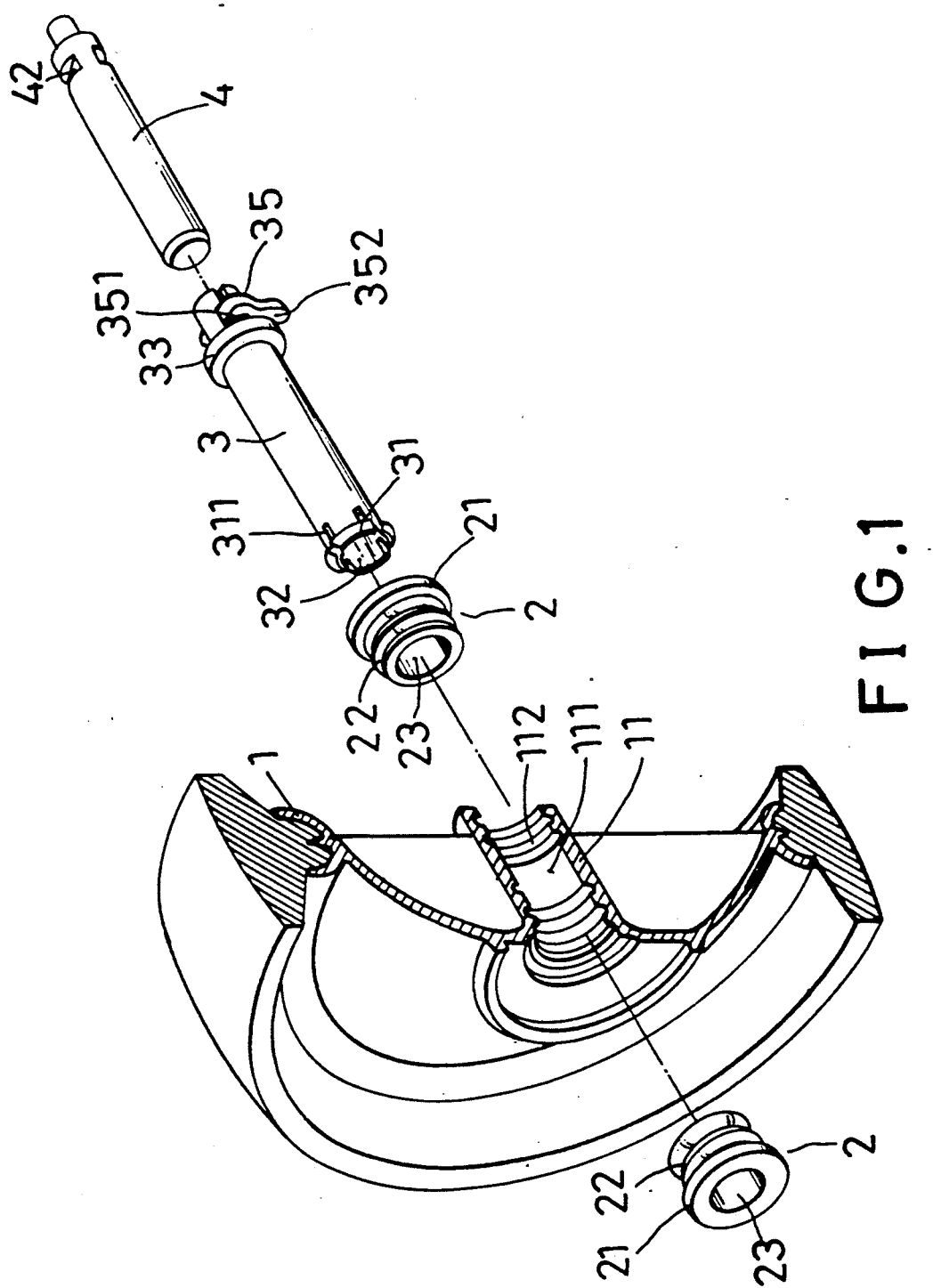
FIG. 1 is an exploded perspective view of the structure for a golf cart wheel shaft in the present invention.
Figures 2, 2A:
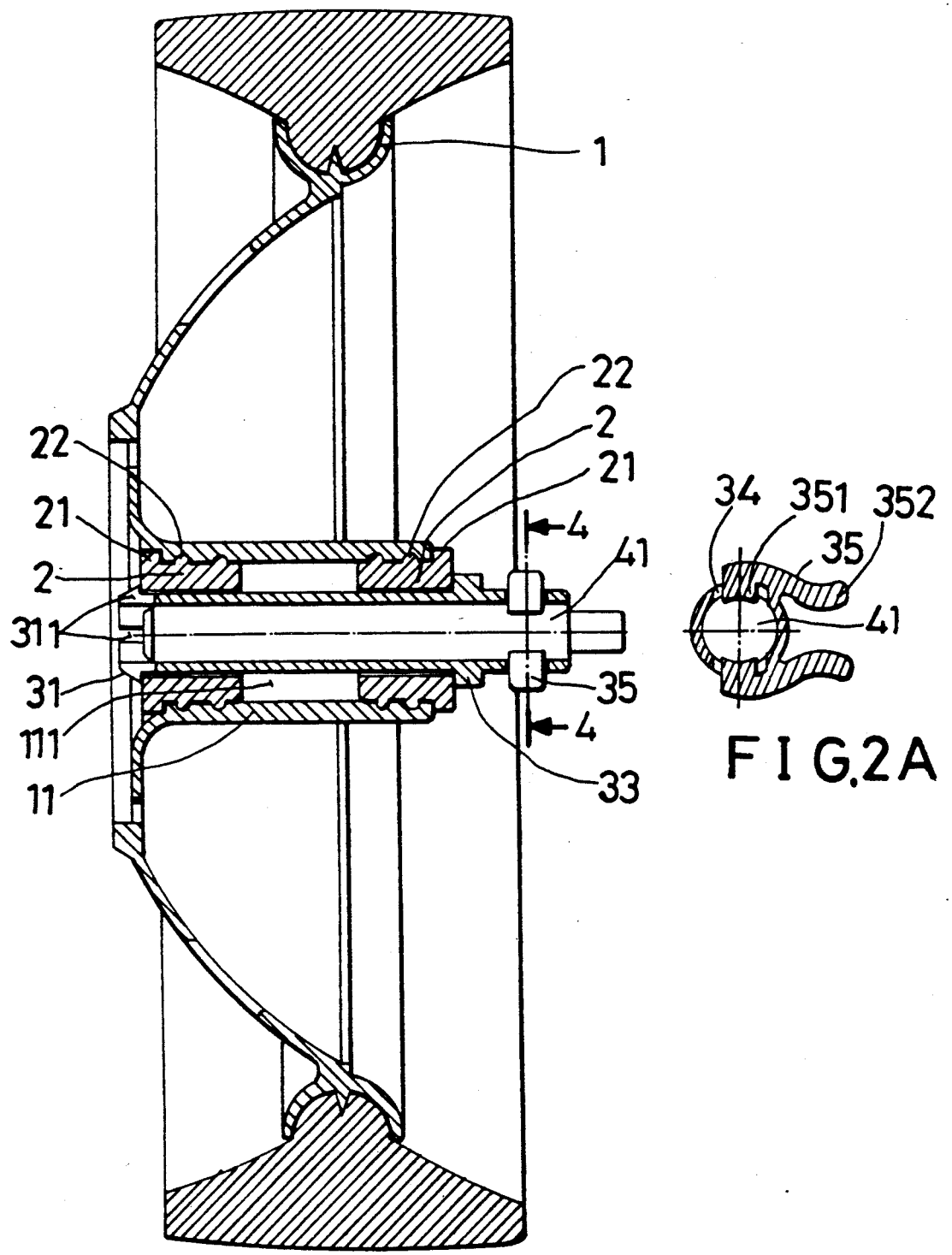
FIG. 2 is a cross-sectional view of the structure for a golf cart wheel shaft in the present invention.
FIG. 2A is a cross-sectional view of a shaft of the structure for a golf cart wheel shaft in the present invention along line 4—4 of FIG. 2; and, FIG. 3 is a cross-sectional view of a conventional golf cart wheel shaft.
Figure 3:
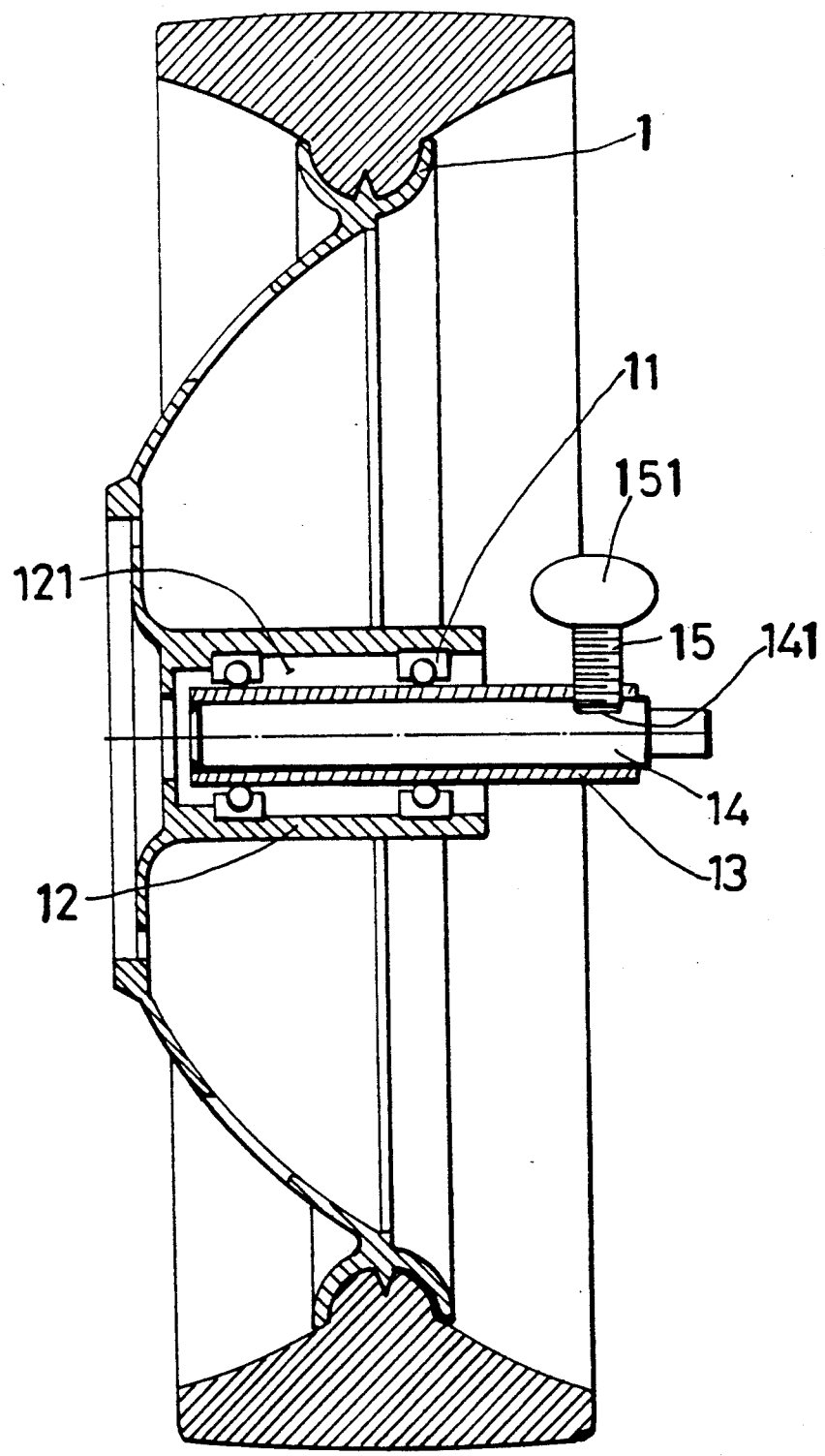

The structure for a golf cart wheel shaft in the present invention, as shown in FIGS. 1 and 2, comprises two hole bushings 2, 2 at both ends of a central hole 111 in a hub 11 of a wheel for receiving a shaft bushing 3. Th bushing 3 extends through hub 11 and receives a shaft 41 within an interior bore 32 of shaft bushing 3. The shaft 41 is fixed in position by two clamping tips 35 which respectively extend through two opposing holes formed in the shaft bushing 3, for respective engagement within two opposing recesses 42, formed in the right end of the shaft 41.

The wheel 1 has a hub 11 provided with a central bore 111, which has opposing ends cut with a plurality of annular grooves 112.

The two hole bushings 2, 2 are each respectively provided with a flange 21 at the outer end, a plurality of annular projections 22 and a central bore 23.

The shaft bushing 3 is formed in a cylindrical shape with an outer diameter a little smaller than the diameter of the central bores 23 of each of the hole bushings 2, 2, and has a sloped ring shaped projecting portion 31 formed on the left end. Shaft bushing 3 is provided with a plurality of lengthwise, equally spaced slots 311 in the ring portion 31, and a ring portion 33 is formed at the right end of bushing 3, and two opposing fitting holes 34 are formed in the right end. Integrally formed in one-piece formation in the right end of bushing 3 there are formed two elastic clamping fingers 35 adjacent the two fitting holes 34. Each of the clamping fingers consists of a fitting tip 351 and a pressing end 352. Thus, the fitting tips 351 are elastically biased for insert through the holes 34, and are displaced therefrom by pressing the pressing ends 352, as shown in FIG. 2A.

The shaft 41 is adapted to fit within the central bore 32 in the shaft bushing 3, having two opposing recesses 42 formed in the right end thereof for receiving the fitting tips 351 therein, thereby enabling the shaft 41 to move together with the shaft bushing 3, as shown in FIG. 1.

In assembling this structure, as shown in FIG. 2, the two hole bushings 2, 2 are first forced into respective opposing ends of the central bore 111 of the hub 11, while the bushings 2, 2 are still soft, immediately as they are taken out of a mold. This assembly is left to cool off, with the annular projections 22 firmly engaged within the annular grooves 112. Next, the shaft bushing 3 is inserted through the two hole bushings 2, 2 with the vertical edge of the sloped ring shaped portion 31 and the fitting ring portion 33 each being in flush contact with the outer end surface of a respective hole bushing, thereby maintaining the position of the shaft bushing 3, but allowing it to rotate within the central bore 23 of each of the hole bushings 2, 2. Then the shaft 41 is inserted in the central bore 32, with the two recesses 42 aligned with the fitting holes 34 so that the fitting tips 35 of the elastic clamping fingers 35 may pass through the fitting holes 34 and engage the two recesses 42, whereby the shaft 41 and the shaft bushing 3 rotate together synchronously, as shown in FIGS. 1, 2 and 2A.

What is claimed is:

1. A golf cart wheel axle structure for rotatable coupling of a hub of said wheel to said axle, comprising:
   an axle shaft having a pair of recess openings formed on opposing sides adjacent one end thereof;
   first bushing means for coupling to said hub of said wheel, said first bushing means includes a pair of first bushing members, each of said pair of first bushing members having plurality of annular projections for respective engagement within a plurality of annular grooves formed in opposing ends of a central through bore formed in said hub; and second bushing means for rotatable coupling with said pair of first bushing members and releasable locking coupling with said axle shaft, said second bushing means includes (1) a longitudinally extended tubular bushing member, said tubular bushing member having a tubular wall defining a central through bore for receiving said axle shaft therein, (2) an annular ring projection from an exterior surface of said tubular bushing member, said annular ring being formed adjacent a first end of said tubular bushing member for contact with an outer end surface of a respective one of said pair of first bushing members, (3) a plurality of resilient finger-like members extending longitudinally from a second end of said tubular bushing member, each of said plurality of resilient fingers having a sloped projection formed on a distal end thereof for engagement with an outer end surface of a respective other of said pair of first bushing members, and (4) a pair of resilient clamping members integrally formed with said tubular bushing member in one-piece formation, each of said pair of clamping members having a projecting tip passing through a respective opening formed through said tubular bushing wall for engagement with a respective one of said pair of recess openings of said axle shaft, each of said pair of clamping members having a lever portion for displacing said projecting tip from said engagement with a respective recess opening of said axle shaft responsive to an externally applied force thereto, whereby said first and second bushing means coact to provide rotatable coupling between said wheel and said axle shaft.

* * * * *